Feb. 2, 1954 — L. I. OSBORN — 2,667,751
REPAIR CHAMBER FOR SUBMERGED PIPE LINES
Filed May 20, 1952 — 2 Sheets-Sheet 1
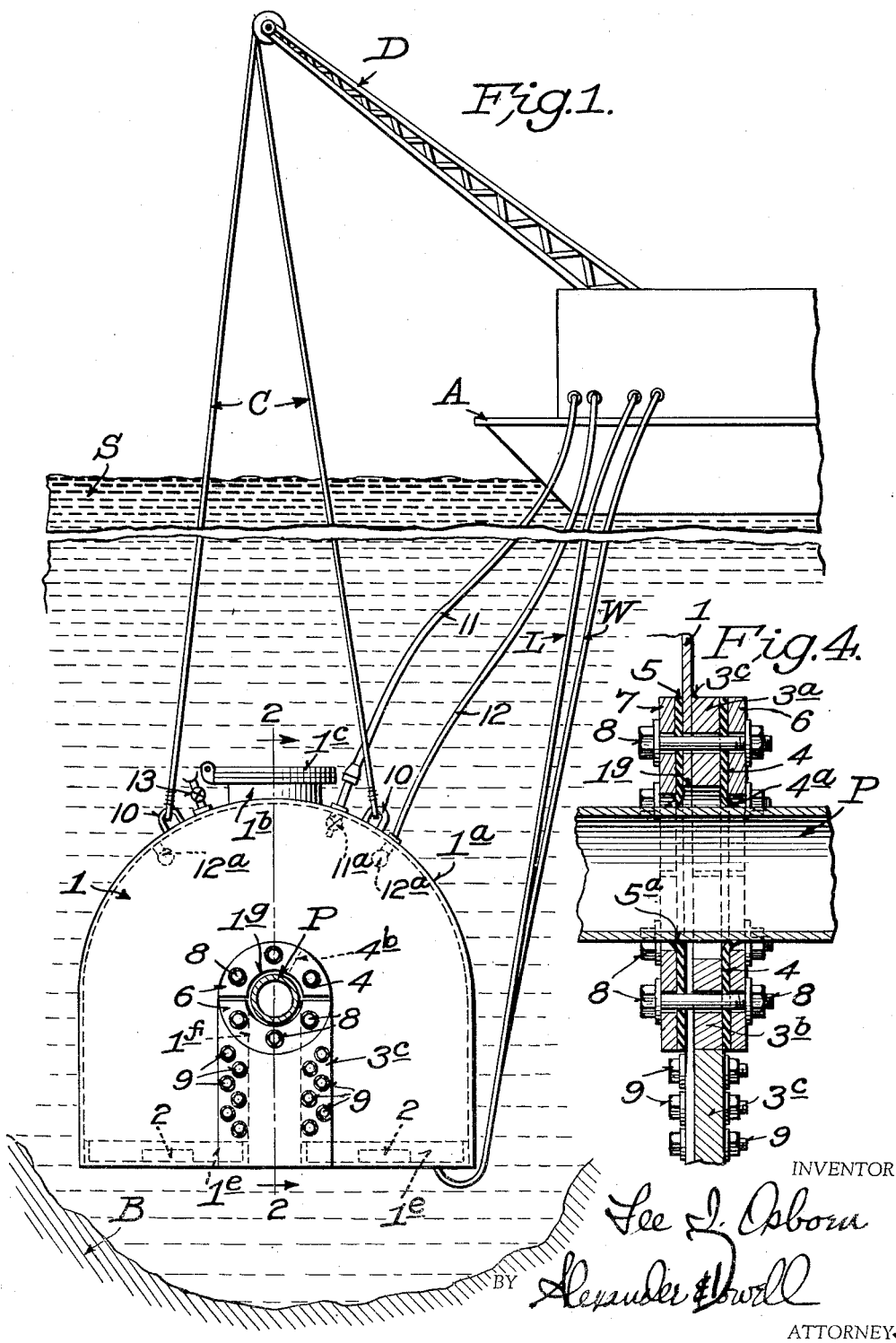
INVENTOR
Lee I. Osborn
BY Alexander Dowell
ATTORNEYS

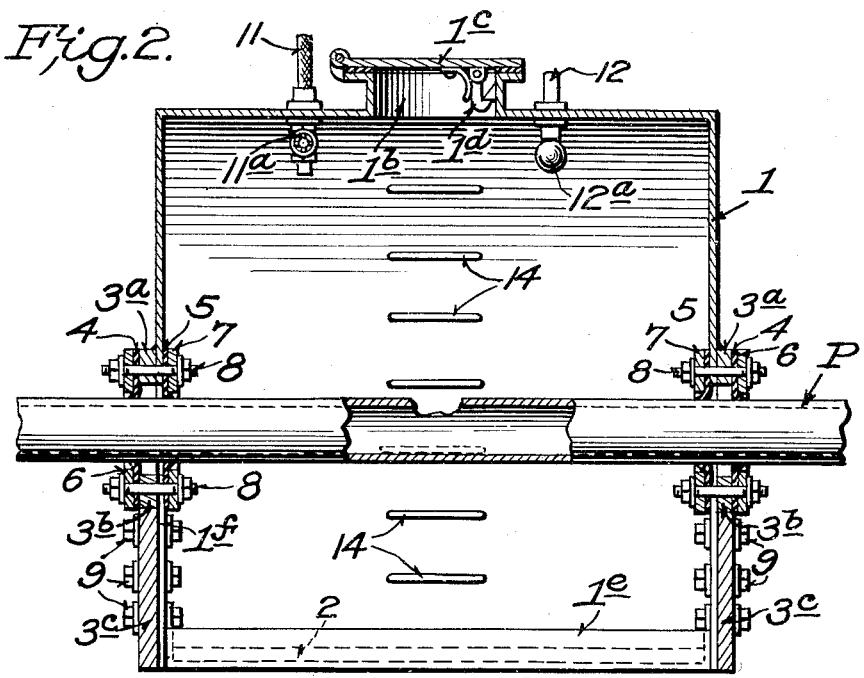
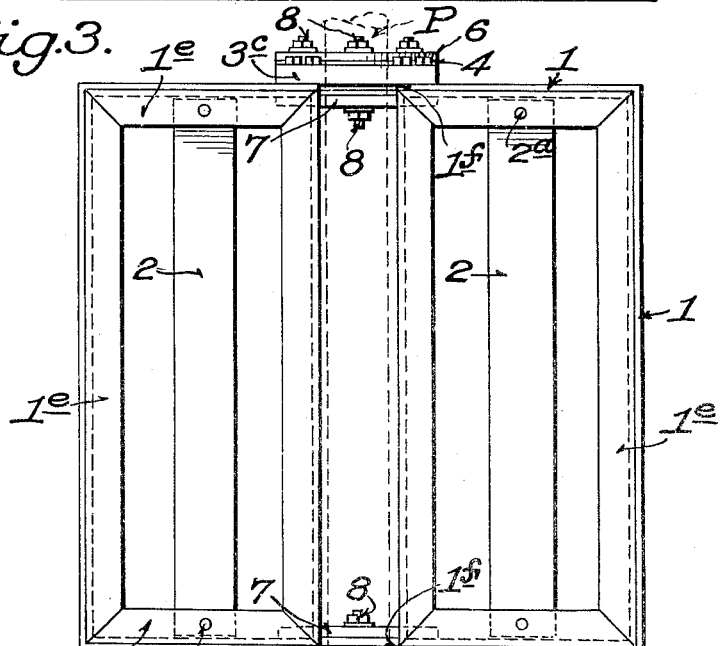

Patented Feb. 2, 1954

2,667,751

UNITED STATES PATENT OFFICE 2,667,751

REPAIR CHAMBER FOR SUBMERGED PIPE LINES

Lee I. Osborn, Muscatine, Iowa

Application May 20, 1952, Serial No. 288,893

10 Claims. (Cl. 61—69)

My invention is a novel chamber adapted to be fixed on a section of submerged pipe line to isolate such pipe line and permit repair thereof under dry working conditions.

The principal object of my invention is to provide a bell-type chamber which is lowered into a river or other body of water through which a pipe line passes, a pair of opposite end walls of said chamber being provided with slots to receive the pipe line, and said slots being closed as by packing means which prevents the entry of water therepast so that air may be introduced into the chamber to force the water therefrom.

Another object of my invention is to provide a repair chamber which is open at the bottom and which has a quick-release air valve at its top, which valve may be opened as the chamber is lowered into the water so that the air therein may escape to permit the said chamber to sink to the pipe-line level.

Still another object of my invention is to provide a chamber having brackets located around the lower open periphery thereof, which brackets support floor boards which are spaced to permit a diver to enter the chamber from below, and upon which the diver may stand while doing the repair work.

Another object of my invention is to provide a chamber having an emergency hatch in the top thereof through which the diver may escape in case the bottom of the bell should become blocked.

Another important object of my invention is to provide a repair chamber having opposed pipe-line receiving slots the width of which slots is sufficient to receive the largest-diameter pipe line to be repaired, and the slots being closed against subsequent entry of water by plates and packing which are secured to the chamber in the vicinity of the slot and which packing has an internal diameter of the proper size to receive the particular pipe line under repair at the time. The packing also serves to anchor the chamber to the pipe line during the repair operations thereon.

Still another object of my invention is to provide a packing which resists rupture from pressure thereagainst whether the pressure comes from inside or outside of the chamber, said packing being quickly and easily secured in place or removed by the diver.

A further object is to provide a packing, the tightness of which increases with increased pressure thereagainst.

Other objects and advantages of my invention will become apparent during the following discussion of the drawings, wherein:

Figure 1 is a sectional view taken through a body of water, showing the pipe line with the chamber secured thereto and showing a barge floating on the surface of the water in operative association with said chamber.

Fig. 2 is a section view along the line 2—2, Fig. 1.

Fig. 3 is a bottom view looking up into the bottom of the chamber.

Fig. 4 is an enlarged view of the right-hand packing assembly shown in Fig. 2.

Referring now to the drawings, Figure 1 shows a pipe line P submerged below the surface S of a body of water, the bottom B therebelow having been dredged under the pipe line in the vicinity of the section thereof to be repaired. Floating at the surface of the body of water is a barge A having a supporting derrick D, the upper end of which is located directly over the repair chamber 1, which repair chamber is shown in Fig. 1 clamped around the pipe line P in operative association therewith.

The repair chamber 1 has a rounded upper portion 1a having an annular flange 1b at the top thereof, which flange forms the mouth of the escape hatch which normally closes this opening by means of a hinged cover 1c, which cover is provided with a latch means 1d capable of being opened from inside the chamber. Around the lower periphery of the chamber are fixed a plurality of angle irons 1e, which angle irons support several floor boards 2 for the purpose hereinafter explained, the floor boards 2 being fixed at their ends to the angle irons as by bolts 2a to prevent displacement of the boards during use thereof.

Two opposed ends of the chamber 1 are provided with upwardly-extending slots 1f, which slots are adapted to pass the pipe line P, thereby permitting the chamber to be lowered over the pipe line until the latter is disposed at the approximate center of the chamber. The upper end of each slot is radiused as at 1g, so that when the chamber is lowered over the pipe line, the latter will rest upon the radiused portion 1g.

The packing, which not only closes the chamber in the vicinity of the pipe line against entry of water but also anchors the chamber to the pipe line, comprises a plurality of semi-circular rings adapted to be fixed to the chamber in the vicinity of the pipe line. As best shown in Fig. 1, these packing rings include a pair of relatively thick semi-circular members 3a and 3b, the members 3a being welded as at 3c to the chamber 1, and the ends of the members 3b being aligned with the ends of the member 3a, so as to form a complete ring around the pipe line.

Next to the members 3a and 3b on the outside of the chamber is a rubber gasket 4, the inside diameter of which gasket is smaller than the outside diameter of the pipe line, so that when the gasket is fixed in place therearound, the inner periphery 4a of the rubber gasket 4 will tightly engage the pipe line and bend outwardly, as shown at 4a.

Within the chamber 1 is another annular gasket 5 of the same characteristics as the gasket 4 and fitting tightly against the pipe line, its inner periphery bending inwardly as at 5a and both the gaskets 4 and 5 being split at one point, as shown at 4b, Fig. 1, to permit the insertion of the gaskets on the pipe line during installation. The breaks in all of the gaskets and rings are annularly staggered to provide a tortuous path, to minimize water seepage.

To hold the packing in place, I provide inner and outer semi-circular sets of rings 6 and 7, which bear against the rubber gaskets 4 and 5 respectively, and secure the same tightly in place; the whole assembly being provided with an annular series of spaced holes through which a series of bolts 8 transfix the various rings and gaskets and secure the same in tight engagement with each other. In order to close the slot 1f against entry of water, I provide the lower ring member 3b with a downwardly-extending plate 3c adapted to overlie the ends of the chamber 1 adjacent the slot 1f and be secured to the chamber as by bolts 9.

Near the top of the chamber 1, I provide a set of lifting lugs 10, to which cables C are attached, said cables extending upwardly to the derrick D and being used to lower and raise the chamber 1 during the beginning and ending stages of the operation.

Other connections between the barge A and the chamber 1 include a compressed air line 11, the lower end of which is connected through a water-tight fitting to a valve 11a within the chamber, and include an electric cable 12 which furnishes power to the chamber 1 to illuminate the light bulbs 12a. Fig. 1 also shows two additional lines extending from the barge A up into the chamber 1, said lines including a diver's air line L and a welding cable W, the diver not being shown in the drawings.

At the top of the chamber, I also provide an air release valve 13 communicating through a duct with the interior of the chamber. The valve is preferably of the quick-acting type and serves the purpose hereinafter discussed.

The operation of my repair chamber is as follows:

Before the chamber is lowered into position about the pipe line P, a diver is sent down from the barge A to determine whether or not the pipe line is sufficiently exposed to permit the chamber to be clamped about the pipe line without the necessity of dredging away a portion of the river bottom B. If the pipe line is not sufficiently exposed, a portion of the river bottom B must be dredged away in the vicinity of the leak in the pipe line, as shown in Fig. 1.

When the pipe line is thus exposed, the chamber 1 is brought into position directly above the leak, the air release valve 13 is opened, and the chamber is lowered slowly on the cables C by the derrick D, the air within the chamber being permitted to escape through the valve 13 so that the chamber will sink to a point at which it can be engaged about the pipe line P. As soon as the chamber is down to the pipe line level, a diver is sent down to close the air release valve 13 and to bolt the packing members 3b, 3c, 4, 5, 6 and 7 in place to form water-tight joints in the vicinity of the slots 1f—1g.

Upon completion of the securing and packing operation, the diver enters the chamber from below between the floor boards 2 and opens the valve 11a to permit air from the compressed air line 11 to be forced into the chamber, said air forcing water out of the chamber so as to permit repair of the pipe line under dry working conditions, the light bulbs 12a providing sufficient illumination for the repair operations.

The hatch cover 1c would not be opened during ordinary diving operations wherein such operations are conducted in deep water, unless as a result of shifting of the river bottom or other accidental blocking of the bottom opening in the chamber, the diver should be trapped therewithin. In the event of such accidental occurrence, the hatch and associated ladder 14 would provide a safe exit for the diver.

After the repair of the pipe line has been completed, the diver closes the valve 11a and leaves the chamber through the bottom thereof, subsequently opening the air release valve 13 to permit the chamber to refill with water. When the chamber is full of water, he removes the packing plates and the plates 3c which close the slots 1f, thereby releasing the chamber to permit it to be raised above the surface and out of engagement with the body of water by the derrick D, thereby completing the operation with respect to this particular leak in the pipe line.

I do not limit my invention to the exact form shown in the drawings, for obviously changes may be made therein within the scope of the claims.

I claim:

1. A repair device to isolate a leaky section of underwater pipe line, comprising a submergable chamber open at its bottom and having opposite slots in its sides extending upwardly from said bottom and adapted to receive said pipe line with said leaky section within said chamber; packing means fitting snugly around said pipe line and closing said slots against entry of water; a duct through the top of said chamber having a control valve therein; means in said chamber for introducing pressurized air thereinto to force the water from the chamber; an emergency escape hatch in the top of said chamber; and floor boards across the bottom of the chamber, said boards being mutually spaced to provide therebetween access to the interior of the chamber.

2. In a device as set forth in claim 1, said packing means comprising a plate adapted to close each slot; resilient gaskets each having through its center a hole of diameter somewhat smaller than the diameter of said pipe line, a gasket being placed around the pipe line on each side of each slot with the inner periphery of each gasket curving away from the slot to lie along the pipe line; an annular retaining ring against the exposed face of each gasket; and means to transfix and secure said rings and gaskets through the associated chamber wall.

3. A repair device to isolate a leaky section of underwater pipe line, comprising a submergable chamber open at its bottom and having slots in its sides adapted to receive said pipe line with said leaky section within said chamber; packing means fitting around said pipe line and closing said slots against entry of water; means in said chamber for introducing pressurized air thereinto to force the water from the chamber; and floor boards across the bottom of the chamber, said boards being mutually spaced to provide therebetween access to the interior of the chamber.

4. In a device as set forth in claim 3, said packing means comprising a plate adapted to close each slot; resilient gaskets each having through its center a hole of diameter somewhat smaller than the diameter of said pipe line, a gasket being placed around the pipe line on each side of each slot with the inner periphery of each gasket curving away from the slot to lie along the pipe line; an annular retaining ring against the exposed face of each gasket; and means to transfix and secure said rings and gaskets through the associated chamber wall.

5. A repair device to isolate a leaky section of underwater pipe line, comprising a submergable chamber open at its bottom and having slots in its sides adapted to receive said pipeline with said leaky section within said chamber; packing means fitting around said pipe line and closing said slots against entry of water; and means in said chamber for introducing pressurized air thereinto to force the water from the chamber.

6. In a device as set forth in claim 5, said packing means comprising a plate adapted to close each slot; resilient gaskets each having through its center a hole of diameter somewhat smaller than the diameter of said pipe-line, a gasket being placed around the pipe line on each side of each slot with the inner periphery of each gasket curving away from the slot to lie along the pipe line; an annular retaining ring against the exposed face of each gasket; and means to transfix and secure said rings and gaskets through the associated chamber wall.

7. A repair device to isolate a leaky section of underwater pipe line, comprising a submergable chamber having openings in its sides and in its bottom adapted to receive said pipe line with said leaky section within said chamber; packing means fitting said pipe line and closing said openings against entry of water; a duct through the top of said chamber having a control valve therein; means in said chamber for introducing pressurized air thereinto to force the water from the chamber; and an access hatch in said chamber.

8. In a device as set forth in claim 7, said packing means comprising a plate adapted to close each opening; resilient gaskets each having through its center a hole of diameter somewhat smaller than the diameter of said pipe line, a gasket being placed around the pipe line on each side of each opening with the inner periphery of each gasket curving away from the opening to lie along the pipe line; an annular retaining ring against the exposed face of each gasket; and means to compress said rings and gaskets against the associated chamber wall.

9. A repair device to isolate a leaky section of underwater pipe line, comprising a submergable chamber having openings in its sides and in its bottom adapted to receive said pipe line with said leaky section within said chamber; packing means fitting snugly around said pipe line and closing said openings against entry of water; means in said chamber for introducing pressurized air thereinto to force the water from the chamber; and an access hatch in said chamber.

10. In a device as set forth in claim 9, said packing means comprising a plate adapted to close each opening; resilient gaskets each having through its center a hole of diameter somewhat smaller than the diameter of said pipe line, a gasket being placed around the pipe line on each side of each opening with the inner periphery of each gasket curving away from the opening to lie along the pipe line; an annular retaining ring against the exposed face of each gasket; and means to compress said rings and gaskets against the associated chamber wall.

LEE I. OSBORN.

References Cited in the file of this patent

UNITED STATES PATENTS

| Number | Name | Date |
| --- | --- | --- |
| 624,198 | Eicke | May 2, 1899 |